(12) United States Patent
Gronvall et al.

(10) Patent No.: US 7,558,458 B2
(45) Date of Patent: Jul. 7, 2009

(54) UNIVERSAL BRACKET FOR MOUNTING A DROP TERMINAL

(75) Inventors: Erik Gronvall, Richfield, MN (US); Randy Reagan, Clinton, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 4 days.

(21) Appl. No.: 11/715,659

(22) Filed: Mar. 8, 2007

(65) Prior Publication Data
US 2008/0219631 A1    Sep. 11, 2008

(51) Int. Cl.
*G02B 6/00* (2006.01)
(52) U.S. Cl. ................................ 385/135; 385/134
(58) Field of Classification Search .................. 385/135
See application file for complete search history.

(56) References Cited

U.S. PATENT DOCUMENTS

| | | |
|---|---|---|
| 2,047,152 A | 7/1936 | Mitchell |
| 3,691,505 A | 9/1972 | Graves |
| 3,845,552 A | 11/1974 | Waltz |
| 3,879,575 A | 4/1975 | Dobbin et al. |
| 3,912,854 A | 10/1975 | Thompson et al. |
| 3,912,855 A | 10/1975 | Thompson et al. |
| 4,085,286 A | 4/1978 | Horsma et al. |
| 4,107,451 A | 8/1978 | Smith, Jr. et al. |
| 4,152,539 A | 5/1979 | Charlebois et al. |
| 4,322,573 A | 3/1982 | Charlebois |
| 4,343,844 A | 8/1982 | Thayer et al. |
| 4,405,083 A | 9/1983 | Charlebois et al. |
| 4,413,881 A | 11/1983 | Kovats |
| 4,467,137 A | 8/1984 | Paget et al. |
| 4,475,935 A | 10/1984 | Tanaka et al. |
| 4,478,486 A | 10/1984 | Fentress et al. |
| 4,481,380 A | 11/1984 | Wood et al. |
| 4,490,315 A | 12/1984 | Charlebois et al. |
| 4,512,628 A | 4/1985 | Anderton |

(Continued)

FOREIGN PATENT DOCUMENTS

DE        35 37 684 A1    4/1987

(Continued)

OTHER PUBLICATIONS

"FTerm UMT Installation Instruction," *Tyco Electronics Corportion*, pp. 1-4 (Apr. 2007).

(Continued)

*Primary Examiner*—Frank G Font
*Assistant Examiner*—Ryan Lepisto
(74) *Attorney, Agent, or Firm*—Merchant & Gould P.C.

(57) ABSTRACT

The present disclosure relates to a drop terminal mounting system for use in a fiber optic network. The drop terminal mounting system includes a drop terminal having a drop terminal housing to which a plurality of fiber optic adapters are mounted. The fiber optic adapters have exterior ports that are accessible from an exterior of the drop terminal housing. The drop terminal mounting system also includes a bracket including a base portion, having a front side and a back side, a cradle disposed on the front side for receiving the drop terminal, and an channel disposed on the back side of the base portion. The bracket has features that facilitate mounting the bracket to different types of structures such as poles, strands, or to hand-holes.

23 Claims, 6 Drawing Sheets

U.S. PATENT DOCUMENTS

| | | | |
|---|---|---|---|
| 4,528,150 A | 7/1985 | Charlebois et al. |
| 4,528,419 A | 7/1985 | Charlebois et al. |
| 4,549,039 A | 10/1985 | Charlebois et al. |
| 4,550,220 A | 10/1985 | Kitchens |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,168 A | 3/1987 | Nolf et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,685,764 A | 8/1987 | Hoffer et al. |
| 4,701,574 A | 10/1987 | Shimirak et al. |
| 4,717,231 A | 1/1988 | Dewez et al. |
| 4,725,035 A | 2/1988 | Charlebois et al. |
| 4,732,628 A | 3/1988 | Dienes |
| 4,744,622 A | 5/1988 | Cherry et al. |
| 4,747,020 A | 5/1988 | Brickley et al. |
| 4,761,052 A | 8/1988 | Buekers et al. |
| 4,764,232 A | 8/1988 | Hunter |
| 4,800,588 A * | 1/1989 | Poster, Jr. ............... 379/412 |
| 4,805,979 A | 2/1989 | Bossard et al. |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,908,482 A | 3/1990 | Shimirak et al. |
| 4,913,512 A | 4/1990 | Anderton |
| 4,913,522 A | 4/1990 | Noff et al. |
| 4,952,798 A | 8/1990 | Graham et al. |
| 4,961,623 A | 10/1990 | Midkiff et al. |
| 4,963,698 A | 10/1990 | Chang et al. |
| 4,982,083 A | 1/1991 | Graham et al. |
| 4,986,762 A | 1/1991 | Keith |
| 5,004,315 A | 4/1991 | Miyazaki |
| 5,029,958 A | 7/1991 | Hodge et al. |
| 5,042,901 A | 8/1991 | Merriken et al. |
| 5,046,811 A | 9/1991 | Jung et al. |
| 5,048,916 A | 9/1991 | Caron |
| 5,054,868 A | 10/1991 | Hoban et al. |
| 5,066,095 A | 11/1991 | Dekeyser et al. |
| 5,074,808 A | 12/1991 | Beamenderfer et al. |
| 5,076,688 A | 12/1991 | Bowen et al. |
| 5,097,529 A | 3/1992 | Cobb et al. |
| 5,097,530 A | 3/1992 | Holt et al. |
| 5,099,088 A | 3/1992 | Usami et al. |
| 5,115,105 A | 5/1992 | Gallusser et al. |
| 5,121,458 A | 6/1992 | Nilsson et al. |
| 5,122,069 A | 6/1992 | Brownlie et al. |
| 5,125,060 A | 6/1992 | Edmundson |
| 5,133,038 A | 7/1992 | Zipper |
| 5,155,794 A | 10/1992 | Nolf et al. |
| 5,185,844 A | 2/1993 | Bensel, III et al. |
| 5,185,845 A | 2/1993 | Jones |
| 5,194,692 A | 3/1993 | Gallusser et al. |
| 5,208,893 A | 5/1993 | McCall et al. |
| 5,210,812 A | 5/1993 | Nilsson et al. |
| 5,217,808 A | 6/1993 | Cobb |
| 5,222,183 A | 6/1993 | Daems et al. |
| 5,231,687 A | 7/1993 | Handley |
| 5,235,665 A | 8/1993 | Marchesi et al. |
| 5,241,611 A | 8/1993 | Gould |
| 5,245,151 A | 9/1993 | Chamberlain et al. |
| 5,249,253 A | 9/1993 | Franckx et al. |
| 5,267,122 A | 11/1993 | Glover et al. |
| 5,323,480 A | 6/1994 | Mullaney et al. |
| 5,329,428 A | 7/1994 | Block et al. |
| 5,335,408 A | 8/1994 | Cobb |
| 5,347,089 A | 9/1994 | Barrat et al. |
| 5,353,367 A | 10/1994 | Czosnowski et al. |
| 5,376,196 A | 12/1994 | Grajewski et al. |
| 5,378,853 A | 1/1995 | Clouet et al. |
| 5,394,502 A | 2/1995 | Caron |
| 5,396,575 A | 3/1995 | Hayward et al. |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,655 A | 8/1995 | Kaplow et al. |
| 5,440,665 A | 8/1995 | Ray et al. |
| 5,442,726 A | 8/1995 | Howard et al. |
| 5,446,823 A | 8/1995 | Bingham et al. |
| 5,450,517 A | 9/1995 | Essert |
| 5,475,781 A | 12/1995 | Chang et al. |
| 5,479,533 A | 12/1995 | Tanaka |
| 5,479,553 A | 12/1995 | Daems et al. |
| 5,491,766 A | 2/1996 | Huynh et al. |
| 5,509,099 A | 4/1996 | Hermsen et al. |
| 5,509,202 A | 4/1996 | Abdow |
| 5,515,472 A | 5/1996 | Mullaney et al. |
| 5,517,592 A | 5/1996 | Grajewski et al. |
| 5,525,756 A | 6/1996 | Mullaney et al. |
| 5,528,718 A | 6/1996 | Ray et al. |
| 5,535,298 A | 7/1996 | Fasnacht et al. |
| D372,897 S | 8/1996 | Curry et al. |
| 5,546,495 A | 8/1996 | Bruckner et al. |
| 5,556,060 A | 9/1996 | Bingham et al. |
| 5,566,268 A | 10/1996 | Radliff et al. |
| 5,566,269 A | 10/1996 | Eberle, Jr. et al. |
| 5,577,151 A | 11/1996 | Hoffer |
| 5,602,954 A | 2/1997 | Nolf et al. |
| 5,613,030 A | 3/1997 | Hoffer et al. |
| 5,633,973 A | 5/1997 | Vincent et al. |
| 5,640,482 A | 6/1997 | Barry et al. |
| 5,657,413 A | 8/1997 | Ray et al. |
| 5,659,650 A | 8/1997 | Arnett |
| 5,661,841 A | 8/1997 | Van Noten |
| 5,666,453 A | 9/1997 | Dannenmann |
| 5,684,911 A | 11/1997 | Burgett |
| 5,689,607 A | 11/1997 | Vincent et al. |
| 5,692,299 A | 12/1997 | Daems et al. |
| 5,696,864 A | 12/1997 | Smith et al. |
| 5,708,753 A | 1/1998 | Frigo et al. |
| 5,732,180 A | 3/1998 | Kaplan |
| 5,734,776 A | 3/1998 | Puetz |
| 5,745,633 A | 4/1998 | Giebel et al. |
| 5,754,723 A | 5/1998 | Fremgen |
| 5,754,724 A | 5/1998 | Peterson et al. |
| 5,757,997 A | 5/1998 | Birrell et al. |
| 5,758,004 A | 5/1998 | Alarcon et al. |
| 5,764,843 A | 6/1998 | Macken et al. |
| 5,764,844 A | 6/1998 | Mendes |
| 5,767,448 A | 6/1998 | Dong |
| 5,777,268 A | 7/1998 | Allen et al. |
| 5,778,122 A | 7/1998 | Giebel et al. |
| 5,781,678 A | 7/1998 | Sano et al. |
| 5,804,765 A | 9/1998 | Siemon et al. |
| 5,823,646 A | 10/1998 | Arizpe et al. |
| 5,825,960 A | 10/1998 | Woodward et al. |
| 5,825,963 A | 10/1998 | Burgett |
| 5,828,807 A | 10/1998 | Tucker et al. |
| 5,861,575 A | 1/1999 | Broussard |

| | | | | | | |
|---|---|---|---|---|---|---|
| 5,886,300 | A | 3/1999 | Strickler | 6,880,986 B2 | 4/2005 | Mynatt et al. |
| 5,892,870 | A | 4/1999 | Fingler et al. | 6,926,449 B1 | 8/2005 | Keenum et al. |
| 5,898,813 | A | 4/1999 | Beier | 7,006,739 B2 | 2/2006 | Elkins, II et al. |
| 5,903,698 | A | 5/1999 | Poremba et al. | 7,013,074 B2 | 3/2006 | Battey et al. |
| 5,907,653 | A | 5/1999 | Burek et al. | 7,016,592 B2 | 3/2006 | Elkins, II et al. |
| 5,911,027 | A | 6/1999 | Macken et al. | 7,072,559 B2 | 7/2006 | Giordano et al. |
| 5,917,648 | A | 6/1999 | Harker | 7,120,347 B2 | 10/2006 | Blackwell, Jr. et al. |
| 5,933,563 | A | 8/1999 | Schaffer et al. | 7,142,764 B2 | 11/2006 | Allen |
| 5,945,633 | A | 8/1999 | Ott et al. | 7,292,763 B2 | 11/2007 | Smith et al. |
| 5,969,294 | A | 10/1999 | Eberle et al. | 7,298,952 B2 | 11/2007 | Allen |
| 5,982,971 | A | 11/1999 | Amirkalali | 7,330,629 B2 | 2/2008 | Cooke et al. |
| 5,997,186 | A | 12/1999 | Huynh et al. | 7,333,708 B2 | 2/2008 | Blackwell, Jr. et al. |
| RE36,592 | E | 2/2000 | Giebel et al. | 7,340,145 B2 | 3/2008 | Allen |
| 6,086,263 | A | 7/2000 | Selli et al. | 7,346,253 B2 * | 3/2008 | Bloodworth et al. ........ 385/135 |
| 6,104,846 | A | 8/2000 | Hodgson et al. | 7,397,997 B2 | 7/2008 | Ferris et al. |
| 6,122,420 | A | 9/2000 | Satoh | 7,477,824 B2 | 1/2009 | Reagan et al. |
| 6,160,946 | A | 12/2000 | Thompson et al. | 2003/0077041 A1 | 4/2003 | Belaidi et al. |
| 6,167,183 | A | 12/2000 | Swain | 2003/0103750 A1 | 6/2003 | Laporte et al. |
| RE37,028 | E | 1/2001 | Cooke et al. | 2003/0123838 A1 | 7/2003 | Wang et al. |
| 6,175,079 | B1 | 1/2001 | Johnston et al. | 2004/0028368 A1 | 2/2004 | Hileman et al. |
| 6,181,861 | B1 | 1/2001 | Wenski et al. | 2004/0062508 A1 | 4/2004 | Blankenship et al. |
| 6,208,796 | B1 | 3/2001 | Williams Vigliaturo | 2004/0074852 A1 | 4/2004 | Knudsen et al. |
| 6,215,930 | B1 | 4/2001 | Estes et al. | 2004/0123998 A1 | 7/2004 | Berglund et al. |
| 6,215,939 | B1 | 4/2001 | Cloud | 2004/0126069 A1 | 7/2004 | Jong et al. |
| 6,229,948 | B1 | 5/2001 | Blee et al. | 2004/0211774 A1 | 10/2004 | Daoud et al. |
| 6,250,816 | B1 | 6/2001 | Johnston et al. | 2004/0228589 A1 | 11/2004 | Melton et al. |
| 6,255,584 | B1 | 7/2001 | Renaud | 2004/0247265 A1 | 12/2004 | Takano et al. |
| 6,259,024 | B1 | 7/2001 | Daoud | 2005/0053342 A1 | 3/2005 | Melton et al. |
| 6,263,142 | B1 | 7/2001 | Mardirossian et al. | 2005/0069275 A1 | 3/2005 | Brants et al. |
| 6,275,639 | B1 * | 8/2001 | Bolt et al. .................... 385/135 | 2005/0094959 A1 * | 5/2005 | Sibley et al. ................. 385/135 |
| 6,275,640 | B1 | 8/2001 | Hunsinger et al. | 2005/0111799 A1 | 5/2005 | Cooke et al. |
| 6,292,614 | B1 | 9/2001 | Smith et al. | 2005/0111800 A1 | 5/2005 | Cooke et al. |
| 6,300,562 | B1 | 10/2001 | Daoud | 2005/0129375 A1 | 6/2005 | Elkins, II et al. |
| 6,343,950 | B1 | 2/2002 | Eginton et al. | 2005/0145522 A1 * | 7/2005 | Bloodworth et al. ........ 206/409 |
| 6,363,200 | B1 | 3/2002 | Thompson et al. | 2005/0163448 A1 | 7/2005 | Blackwell, Jr. et al. |
| 6,376,774 | B1 | 4/2002 | Oh et al. | 2005/0175307 A1 | 8/2005 | Battey et al. |
| 6,396,989 | B1 | 5/2002 | Johnston et al. | 2005/0175308 A1 | 8/2005 | Elkins, II et al. |
| 6,407,338 | B1 | 6/2002 | Smith | 2005/0185895 A1 | 8/2005 | Keenum et al. |
| 6,424,782 | B1 | 7/2002 | Ray | 2005/0213921 A1 * | 9/2005 | Mertesdorf et al. ......... 385/135 |
| 6,439,523 | B1 | 8/2002 | Chandler, Jr. et al. | 2005/0220421 A1 | 10/2005 | Keenum et al. |
| 6,439,777 | B1 | 8/2002 | Harrison et al. | 2005/0259928 A1 | 11/2005 | Elkins, II et al. |
| 6,439,779 | B1 | 8/2002 | Hafer | 2005/0259929 A1 | 11/2005 | Elkins, II et al. |
| 6,453,106 | B1 | 9/2002 | Glaser et al. | 2005/0259930 A1 | 11/2005 | Elkins, II et al. |
| 6,454,464 | B1 | 9/2002 | Nolan | 2005/0276552 A1 | 12/2005 | Cooke et al. |
| 6,466,725 | B2 | 10/2002 | Battey et al. | 2006/0056782 A1 | 3/2006 | Elkins, II et al. |
| 6,486,399 | B1 * | 11/2002 | Armstrong et al. ............ 174/58 | 2006/0093303 A1 | 5/2006 | Reagan et al. |
| 6,493,500 | B1 | 12/2002 | Oh et al. | 2006/0098932 A1 | 5/2006 | Battey et al. |
| 6,504,986 | B1 | 1/2003 | Wambeke et al. | 2006/0153516 A1 * | 7/2006 | Napiorkowski et al. ..... 385/135 |
| 6,504,987 | B1 | 1/2003 | Macken et al. | 2006/0153517 A1 | 7/2006 | Reagan et al. |
| 6,507,691 | B1 | 1/2003 | Hunsinger et al. | 2006/0198593 A1 | 9/2006 | Ivancevic |
| 6,535,682 | B1 | 3/2003 | Puetz et al. | 2006/0285810 A1 | 12/2006 | Vanhentenrijk et al. |
| 6,539,160 | B2 | 3/2003 | Battey et al. | 2007/0104448 A1 | 5/2007 | Allen |
| 6,579,014 | B2 | 6/2003 | Melton et al. | 2007/0189694 A1 | 8/2007 | Mullaney et al. |
| 6,583,867 | B1 | 6/2003 | Jennings et al. | 2008/0131068 A1 | 6/2008 | Mertesdorf et al. |
| 6,619,697 | B2 | 9/2003 | Griffioen et al. | | | |
| 6,621,975 | B2 | 9/2003 | Laporte et al. | | | |
| 6,648,520 | B2 | 11/2003 | McDonald et al. | | | |

FOREIGN PATENT DOCUMENTS

| | | |
|---|---|---|
| EP | 0 115 725 A1 | 8/1984 |
| EP | 0 511 147 A1 | 10/1992 |
| EP | 0 512 811 A1 | 11/1992 |
| EP | 0 579 929 A1 | 1/1994 |
| EP | 0 805 536 A1 | 11/1997 |
| EP | 0 844 504 A2 | 5/1998 |
| EP | 0 903 604 A2 | 3/1999 |
| EP | 1 361 465 A1 | 11/2003 |
| EP | 1 380 828 A1 | 1/2004 |
| FR | 2 853 775 A1 | 10/2004 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |

| | | | |
|---|---|---|---|
| 6,655,016 | B2 | 12/2003 | Renaud |
| 6,661,961 | B1 | 12/2003 | Allen et al. |
| 6,668,127 | B1 | 12/2003 | Mahony |
| 6,706,968 | B2 | 3/2004 | Yaworski et al. |
| 6,721,484 | B1 | 4/2004 | Blankenship et al. |
| 6,728,451 | B2 | 4/2004 | Kordahi |
| 6,760,531 | B1 | 7/2004 | Solheid et al. |
| 6,763,170 | B2 | 7/2004 | Kordahi et al. |
| 6,764,220 | B2 | 7/2004 | Griffiths et al. |
| 6,766,094 | B2 | 7/2004 | Smith et al. |
| 6,788,846 | B2 | 9/2004 | Hileman et al. |
| 6,788,871 | B2 * | 9/2004 | Taylor ....................... 385/135 |
| 6,810,194 | B2 | 10/2004 | Griffiths et al. |
| 6,819,842 | B1 | 11/2004 | Vogel et al. |
| 6,856,748 | B1 | 2/2005 | Elkins, II et al. |
| 6,880,219 | B2 | 4/2005 | Griffioen et al. |

| | | |
|---|---|---|
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-99946 | 4/2001 |
| JP | 2001-116968 | 4/2001 |
| JP | 2003-177254 | 6/2003 |
| WO | WO 95/07478 | 3/1995 |
| WO | WO 01/50170 A2 | 7/2001 |
| WO | WO 02/06879 A1 | 1/2002 |
| WO | WO 2005/119322 A1 | 12/2005 |
| WO | WO 2006/044080 A1 | 4/2006 |
| WO | WO 2006/050505 A1 | 5/2006 |
| WO | WO 2006/052355 A1 | 5/2006 |

OTHER PUBLICATIONS

International Search Report and Written Opinion mailed Jun. 16, 2008.

"Cable Assemblies: Molding & Termination," http://www.dgo.com/procable.htm, 8 pages (Copyright 2001).

"DAM/BLOK™ Electrical Splice Kit," http://www.pmiind.com/products/damblok.html, 2 pages (Copyright 2000).

"Factory Installed Termination Systems for Fiber Optic Cable Splices," 1 page (admitted as prior art as of the filing date).

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

ADC Telecommunications; "Aerial Mount, MST Installation Drawing"; 1 page; (admitted prior art).

ADC Telecommunications; "OmniReach Multiport Service Terminal Generic Installation Instructions for Carson and Channel Hand-Hole Enclosures"; 3 pages; (admitted prior art).

ADC Telecommunications; "Pole Mount; MST Installation Drawing"; 1 page; (admitted prior art).

ADC Telecommunications; Fiber Cable Management Products Third Edition; 22 pages; Jun. 1998.

ADC Telecommunications; Fiber Panel Products Second Edition; 16 pages; Jul. 1996.

ADC Telecommunications; FL1000 Wall-Mount Box Installation and Operation Guide; 28 pages; ADCP-90-334 Issue 1, Nov. 2004.

ADC Telecommunications; FL2000 Products; 6 pages; Nov. 1996.

ADC Telecommunications; FL2000™ Wall Mount Box Installation Instructions; 18 pages; ADCP-90-210 Issue 4; Jan. 1998.

ADC Telecommunications; FTD1 36-Fiber Wall Box User Manual; 15 pages; ADCP-90-250 Issue 1, Nov. 1996.

ADC Telecommunications; FTUA 4- and 12-Fiber Wall Box User Manual; 14 pages; ADCP-90-249 Issue 2, Mar. 1997.

ADC Telecommunications; Six-Fiber In-Building Wall Box Installation Instructions; 8 pages; ADCP-90-167 Issue 3, Nov. 1997.

ADC Telecommunications; Value-Added Module System; 8 pages; Jun. 1998.

ADC Telecommunications; Wall Mount Box 12/24/35 Fiber User Manual; 16 pages; ADCP-90-149 Issue 3, Jul. 1997.

Exhibits A and B show a drop terminal mounting bracket and a corresponding hanger bracket for hanging the mounting bracket; both the mounting bracket and the hanger bracket were used in public prior to Apr. 5, 2006.

\* cited by examiner

UNIVERSAL BRACKET FOR MOUNTING A DROP TERMINAL

TECHNICAL FIELD

The present invention relates generally to fiber optic distribution systems. More particularly, the present invention relates to methods and devices for mounting drop terminals used in fiber distribution systems.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

Figure 1:
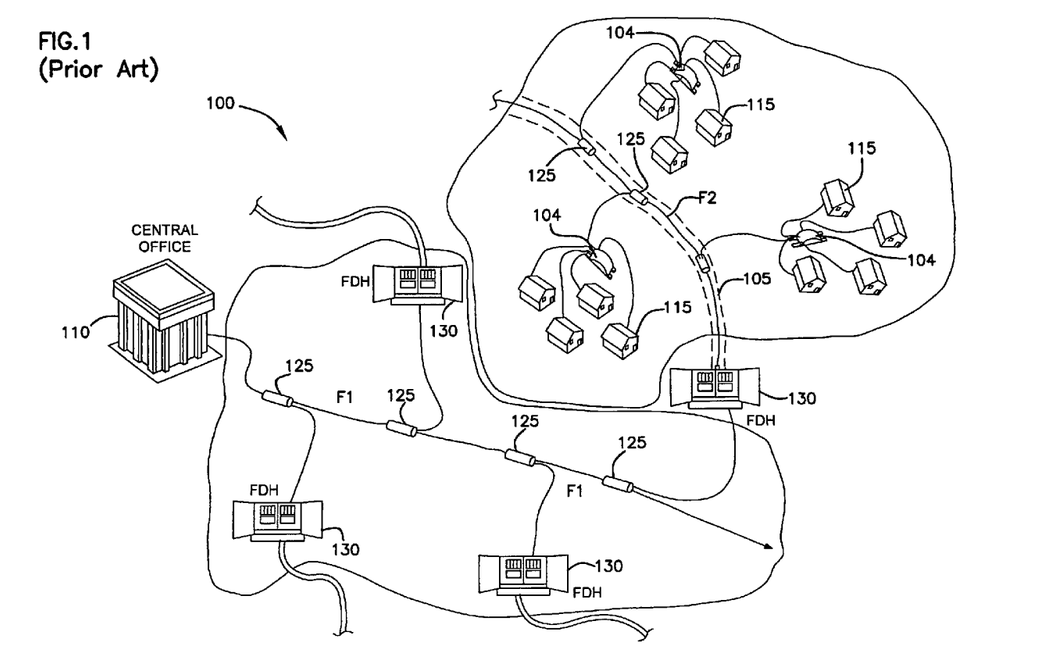
FIG. 1 shows a prior art fiber optic network.

FIG. 1 illustrates a network 100 deploying passive fiber optic lines. As shown in FIG. 1, the network 100 may include a central office 110 that connects a number of end subscribers 115 (also called end users 115 herein) in a network. The central office 110 may additionally connect to a larger network such as the Internet (not shown) and a public switched telephone network (PSTN). The network 100 may also include fiber distribution hubs (FDHs) 130 having one or more optical splitters (e.g., 1-to-8 splitters, 1-to-16 splitters, or 1-to-32 splitters) that generate a number of individual fibers that may lead to the premises of an end user 115. The various lines of the network can be aerial or housed within underground conduits (e.g., see conduit 105).

The portion of network 100 that is closest to central office 110 is generally referred to as the F1 region, where F1 is the "feeder fiber" from the central office. The F1 portion of the network may include a distribution cable having on the order of 12 to 48 fibers; however, alternative implementations may include fewer or more fibers. The portion of network 100 that includes an FDH 130 and a number of end users 115 may be referred to as an F2 portion of network 100. Splitters used in an FDH 130 may accept a feeder cable having a number of fibers and may split those incoming fibers into, for example, 216 to 432 individual distribution fibers that may be associated with a like number of end user locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized.

Stub cables are typically branch cables that are routed from breakout locations to intermediate access locations such as a pedestals, drop terminals or hubs. Intermediate access locations can provide connector interfaces located between breakout locations and subscriber locations. A drop cable is a cable that typically forms the last leg to a subscriber location. For example, drop cables are routed from intermediate access locations to subscriber locations. Drop cables can also be routed directly from breakout locations to subscriber locations hereby bypassing any intermediate access locations FIG. 1 shows several branch cables routed to drop terminals 104. Drop terminals can be mounted on a variety of different structures. For example, a typical drop terminal may be mounted to a pole, a strand (e.g., a fiber optic cable or a copper cable) or inside a hand hole. A typical practice in the field for installation of a drop terminal involves mounting the terminal to a mounting structure using fasteners that extend through-holes integrally formed in the housing of the drop terminal. This practice may involve the use of tools such as hammers that can damage the drop terminal. For example, the drop terminal may be cracked thereby providing a location for water intrusion. Also, fiber optics mounted to the terminal may be damaged thereby rendering the terminal inoperative.

It is also common for an installer to use a bracket to mount a drop terminal to a given structure. Typically, separate, specialized brackets are used for each mounting application. For example, a first type of bracket may be used for a pole mount configuration, a second bracket may be used for a strand mount configuration, and multiple other brackets may be used for a hand hole mount. The use of multiple brackets for different mounting configurations is expensive and requires an installer to maintain a relatively large stock of brackets in his or her truck.

SUMMARY

The present disclosure relates to a drop terminal mounting system including a universal bracket adapted to be mounted to a variety of different structures such as a pole, a strand or inside a hand hole. The universal bracket includes a base portion with a front and back side and at least one strap receiver. A cradle for receiving the drop terminal is located on the front side of the base portion and an channel is located on the back side. In one embodiment, the drop terminal is retained in the cradle by a snap-fit connection. In use, the bracket is initially mounted to the structure to which it is desired to secure the drop terminal. Thereafter, the drop terminal is mounted in the bracket. In this manner, the risks associated with damaging the drop terminal during the mounting process are reduced.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 2:
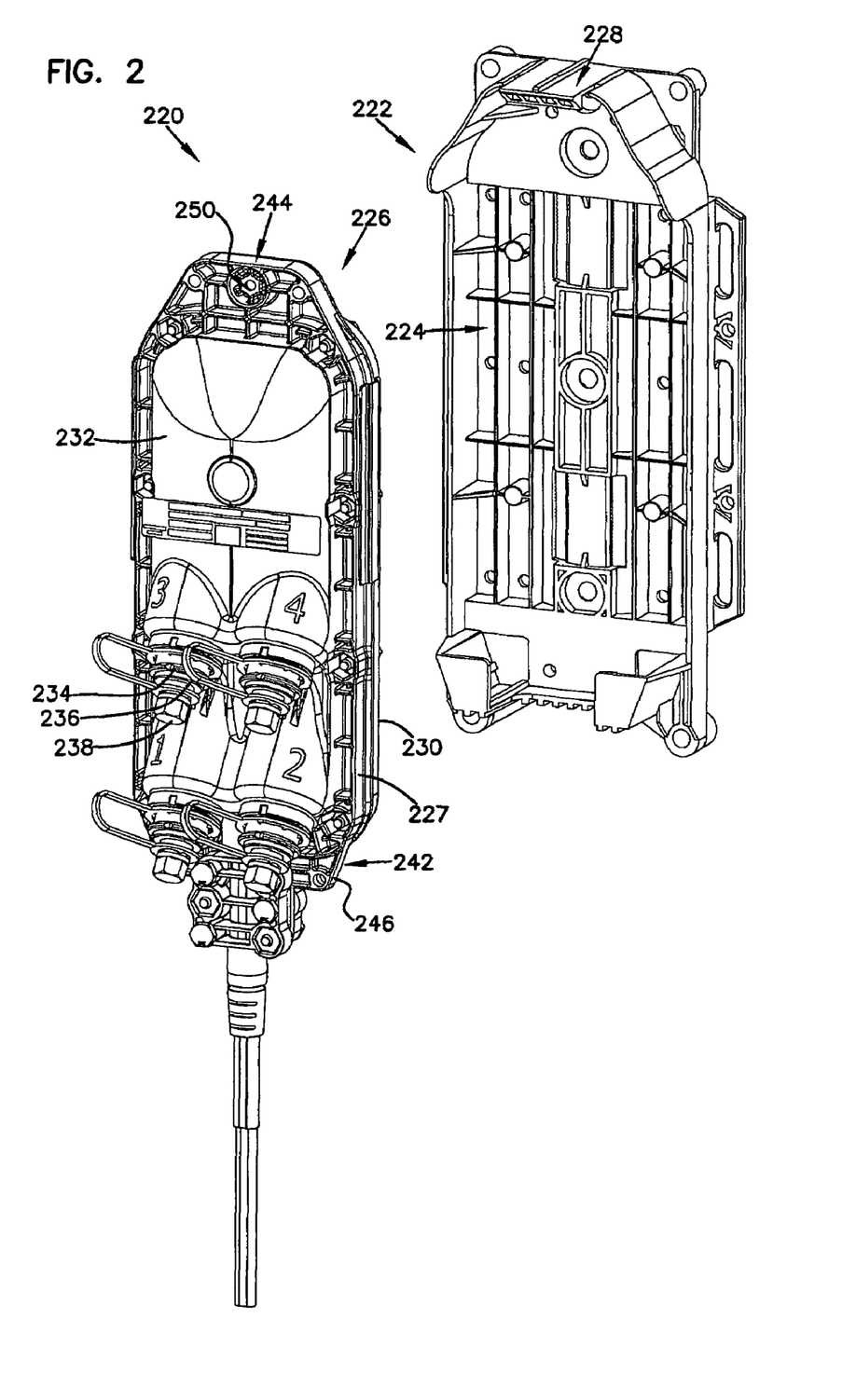
FIG. 2 is an exploded, perspective view of a drop terminal mounting system having features that are examples of inventive aspects in accordance with the principles of the present disclosure, the system includes a universal bracket that receives a drop terminal.
Figure 3:
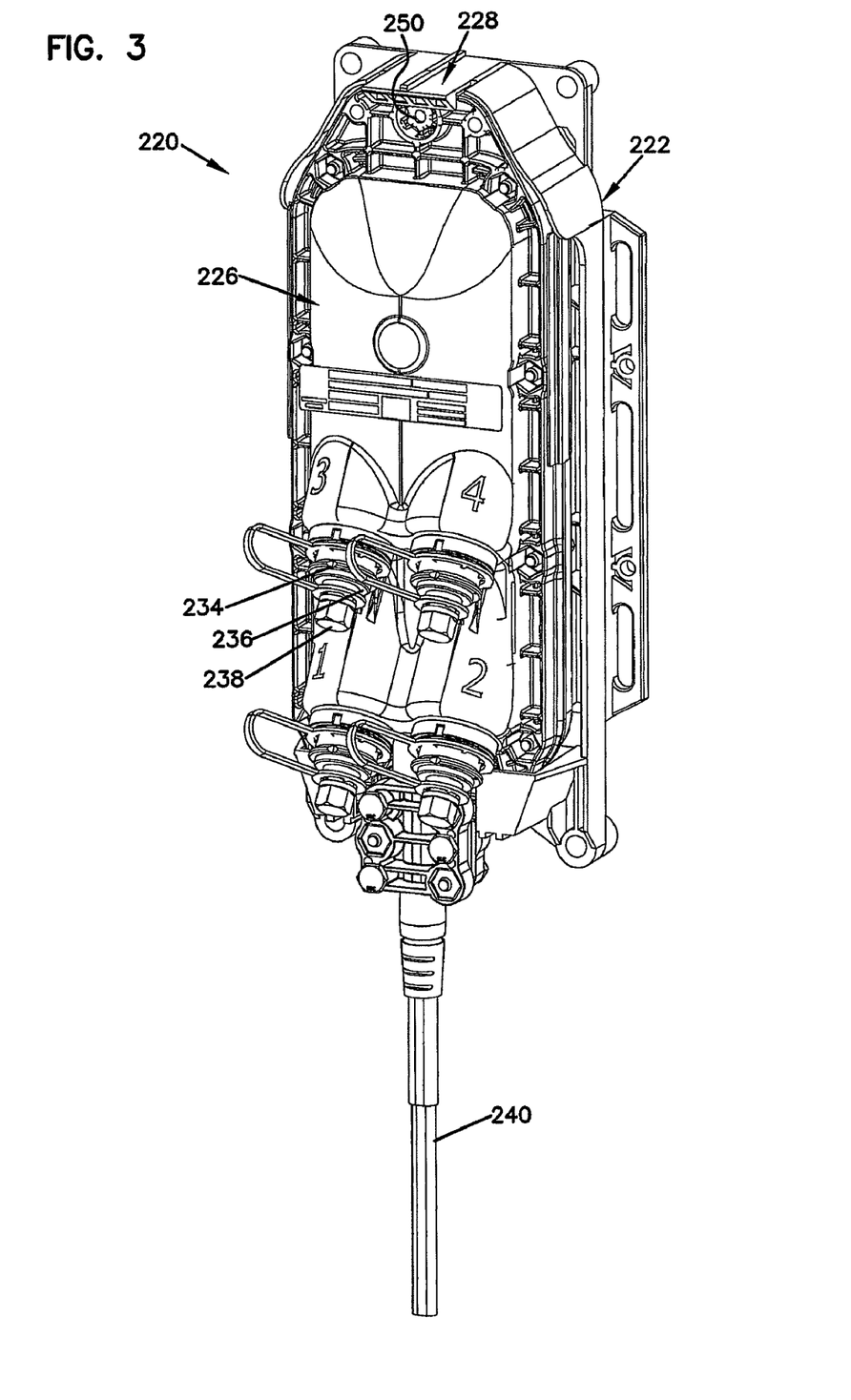
FIG. 3 is a perspective view of the drop terminal mounting system of FIG. 2 with the drop terminal shown mounted within the universal bracket.

Referring to FIGS. 2 and 3, a drop terminal mounting system 220 having features that are examples of inventive aspects in accordance with the principles of the present disclosure is illustrated. The drop terminal mounting system 220 includes a universal bracket 222 adapted to be connected to a variety of different structures such as poles, strands or hand holes. The universal bracket 222 defines a cradle 224 in which a drop terminal 226 can be secured. The universal bracket 222 includes a flexible latch 228 that retains the drop terminal 226 within the cradle 224 by a snap-fit connection.

In use of the system 220, the universal bracket 222 is initially secured to the structure to which it is desired to mount the drop terminal 226. The universal bracket 222 can typically be connected to the structure by use of fastening elements such as straps, ties or fasteners (e.g., bolts, screws or other fasteners). Once the universal bracket 222 has been secured to the structure, the drop terminal 226 can be snapped within the cradle 224 of the universal bracket 222 such that the universal bracket 222 functions to secure the drop terminal 226 to the structure. This type of mounting configuration reduces the likelihood that the drop terminal 226 will be damaged during the mounting process because fasteners do not need to be passed through the drop terminal 226 itself.

The drop terminal mounting system 220 provides numerous advantages. For example, the universal bracket 222 can be universally mounted to a variety of different structures such as poles, strands or hand holes. This reduces the quantity of materials that need to be ordered and carried by installers on their trucks. The configuration of the universal bracket also is adapted to reduce installation time and minimize the numbers of fasteners needed to secure the system to a given structure. The system is further adapted to be easily secured to structures using conventional types of fasteners (e.g., screws, straps, ties) that an installer has readily available on his or her truck. The universal bracket 222 is also compatible with existing legacy brackets that installers may encounter already installed in the field. Moreover, the bracket 222 can be mounted on the drop terminal 226 during shipping to minimize wasted space.

Referring still to FIGS. 2 and 3, the drop terminal 226 includes a housing 227 having a base 230 and a cover 232. A plurality of adapters 234 are mounted to the cover 232. The adapters 234 include exterior ports 236 that are accessible from the outside of the housing 227. The adapters 234 also include interior ports that are accessible from inside the housing 227. The exterior ports 236 are enclosed by plugs 238 when not connected to drop lines. The interior ports receive connectors corresponding to the fibers of a tether 240 (e.g., a branch cable) that is routed into the interior of the housing 227. Further details about the drop terminal 226 can be found in U.S. Pat. No. 7,292,763, which was filed on Mar. 8, 2005, and is hereby incorporated by reference in its entirety.

The housing 227 includes a first end 242 positioned opposite from a second end 244. The tether 240 enters the housing 227 of the drop terminal 226 through the first end 242. Enlarged ears 246 are also provided at the first end 242. A through-hole 250 is provided adjacent the second end 244. The through-hole 250 is also adapted for receiving a fastener.

Figure 4:
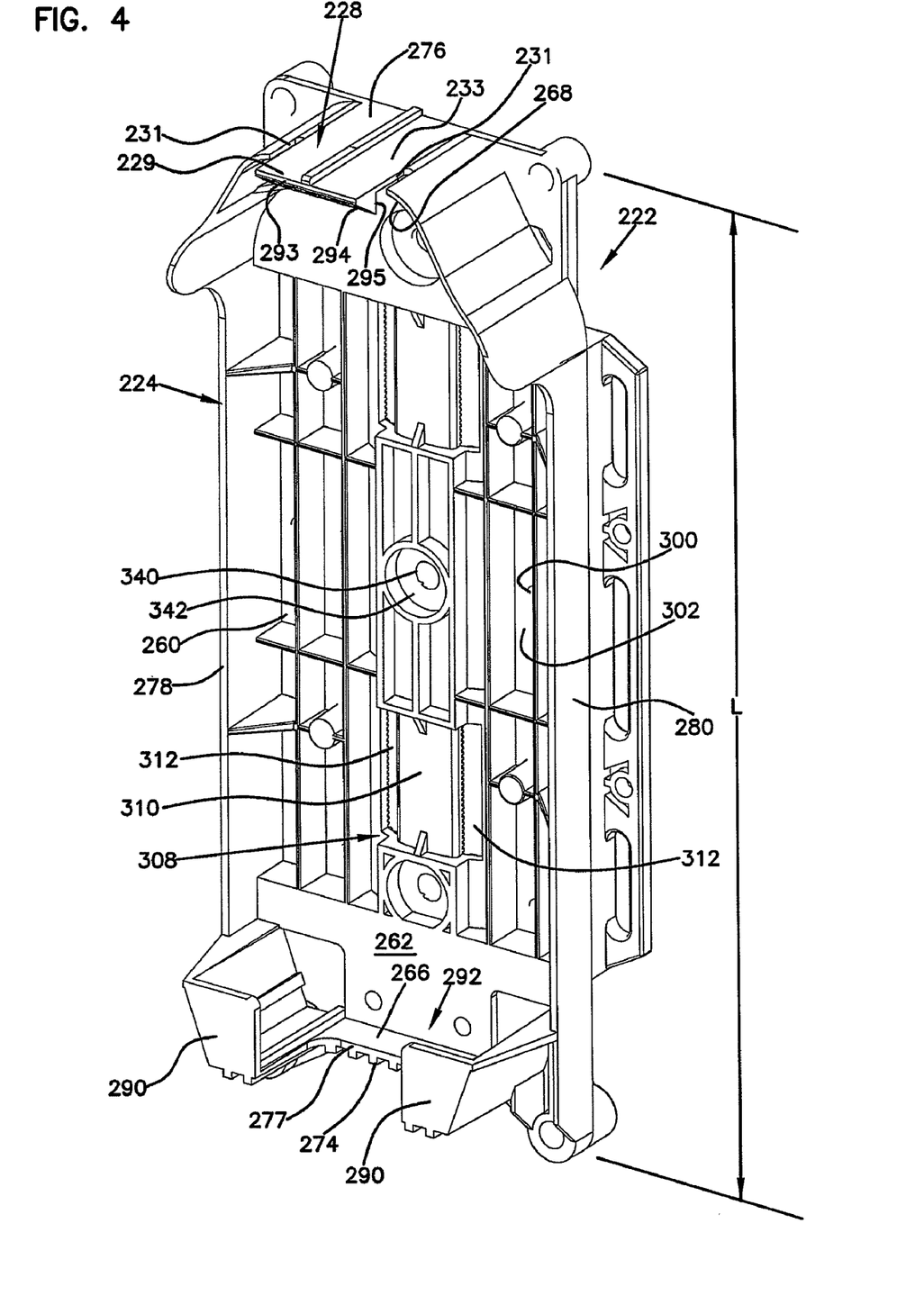
FIG. 4 is a perspective view of the universal bracket used in the system of FIG. 2.
Figure 5:
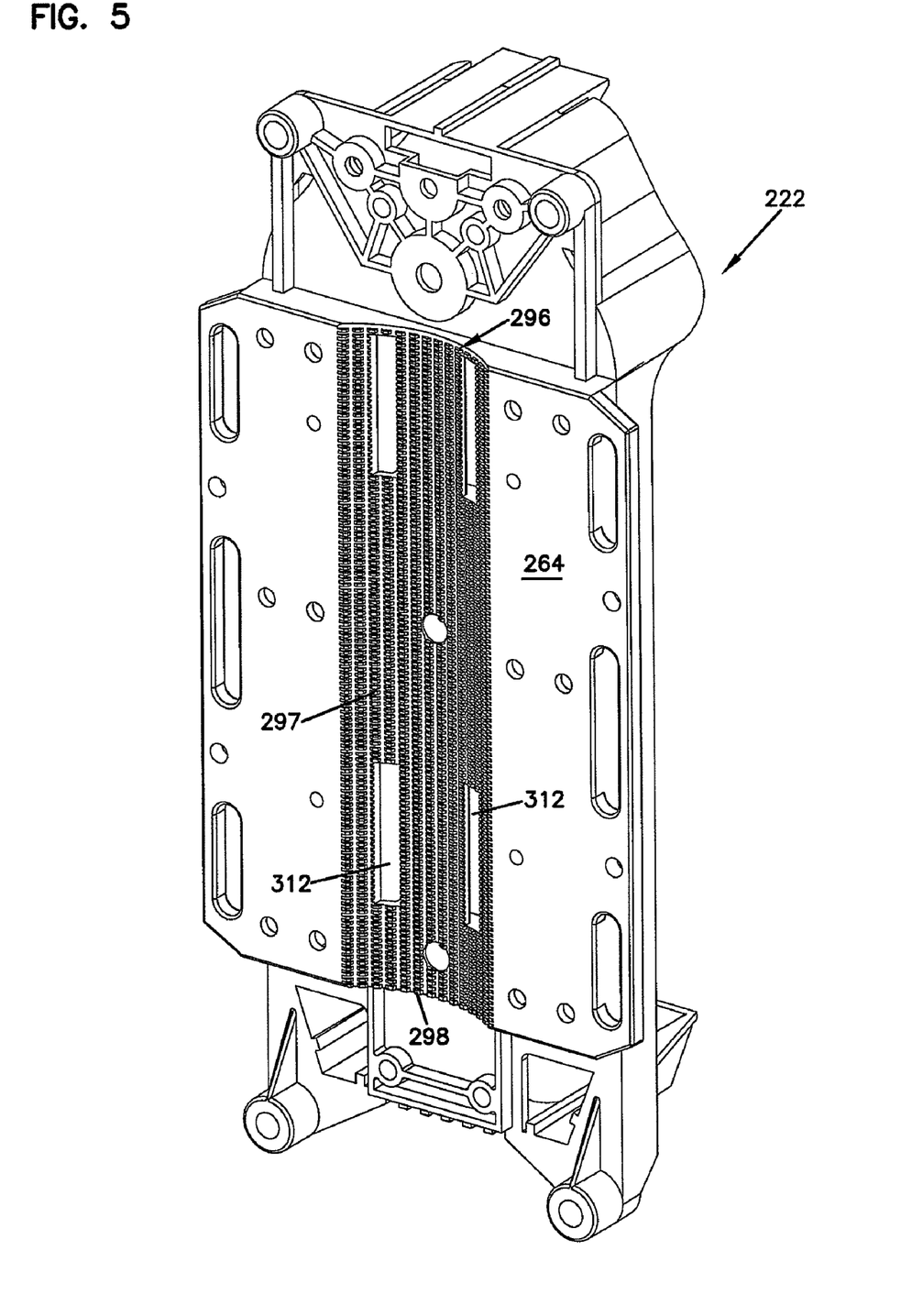
FIG. 5 is a perspective view of the back side of the universal bracket of FIG. 4.

Referring to FIGS. 4 and 5, the universal bracket 222 is depicted as having a one-piece plastic construction. The bracket 222 includes a base portion 260 having a front side 262 (see FIG. 4) and a back side 264 (see FIG. 5). The base portion 260 is elongated along a length L that extends between a first end 266 and a second end 268.

The universal bracket 222 includes structure defining the cradle 224. For example, the bracket 222 includes a first end wall 274 and a second end wall 276. The first end wall 274 projects outwardly from the front side 262 of the base portion 260 adjacent the first end 266 of the base portion 260. The second end wall 276 projects outwardly from the front side 262 of the base portion 260 adjacent the second end 268 of the base portion 260. The bracket 222 further includes side walls 278, 280 that project outwardly from the front side 262 of the base portion 260. As shown in FIG. 4, the side walls 278, 280 have heights that are less than the heights of the end walls 274, 276.

The end walls 274, 276 and the side walls 278, 280 cooperate to define a wall structure of the cradle 224 that is sized and shaped to receive the drop terminal 226. In the depicted embodiments, the end walls 274, 276 and the side walls 278, 280 cooperate to extend around a majority of the periphery of the drop terminal 226. The first end wall 274 includes a notched region 277 that provides clearance for receiving the tether 240 of the drop terminal 226.

The universal bracket 222 further includes structure for securing/retaining the drop terminal 226 within the cradle 224. For example, the bracket 222 includes retention tabs 290 that cooperate with the first end wall 274 to define a pocket 292 adapted to receive the first end 242 of the drop terminal 226. Additionally, the flexible latch 228 of the bracket 222 is mounted at the second end 268 of the base portion 260. The latch 228 includes a flexible latch member 229 provided between two slots 231 defined in the wall 276. The latch member 229 has a cantilevered configuration with a base end 233 that is integral with the wall 276, and a free end 293. A ramp surface 294 is positioned adjacent the free end 293 of the latch member 229, and a retention shoulder 295 is positioned adjacent the ramp surface 294.

Referring to FIGS. 2-5, to mount the drop terminal 226 in the cradle 224, the first end 242 of the drop terminal housing 227 is inserted into the pocket 292, and then the drop terminal 226 is pivoted toward the universal bracket 222. As the drop terminal 226 is pivoted toward the universal bracket 222, the second end 244 of the housing 227 engages the ramp surface 294 of the latch 228 causing the latch to flex outwardly. The latch 228 continues to flex outwardly until the second end 244 passes the retention shoulder 295 of the latch 228. When the second end 244 passes by the retention shoulder 295 of the latch 228, the latch 228 snaps back to a locking position in which the retention shoulder 295 overlaps the second end 244 to lock the drop terminal 226 in place. Once mounted within the cradle 224, the retention shoulder of the latch 228 and the retention tabs 290 of the pocket 292 prevent the drop terminal 226 from being unintentionally disconnected from the universal bracket 222.

To remove the drop terminal 226 from the universal bracket 222, the latch 228 can be manually flexed outwardly to a release position, and the drop terminal 226 can be grasped adjacent to the side walls 278, 280. Thereafter, with the latch 228 in the release position, the drop terminal 226 can be pivoted away from the universal bracket 222 and then slid out of the pocket 292.

Referring to FIG. 5, the universal bracket 222 additionally includes a channel 296, which is located on the back side 264 of the base portion 260. In the subject embodiment, the channel 296 is generally aligned along a centerline of the bracket 222. The channel 296 is an important feature for securely mounting the universal bracket 222 to structures such as strands (e.g. fiber optic cable or copper cable). In order to conform to structures such as strands, the channel 296 has an arcuate shape. It will be understood by those skilled in the art, however, that the scope of the present invention is not limited to the channel having an arcuate shape. The channel 296 defines a gripping surface 297, which in the subject embodiment includes a plurality of gripping protrusions 298. The function of the channel 296 and the gripping surface 297 shall be described in greater detail subsequently.

Referring to FIGS. 4 and 5, the universal bracket 222 also includes at least one strap receiver 308. The strap receiver 308 is aligned generally along a centerline of the universal bracket 222 on the front side 262 of the base portion 260. As shown in FIG. 4, the strap receiver 308 includes a strap-receiving member 310 that is recessed relative to the front side 262 of the base portion 260. The strap-receiving member 310 (e.g., loops) defines slots 312 for receiving a strap. In the subject embodiment, the slots 312 are positioned such that the slots 312 extend from the front side 262 through the channel 296 on the back side 264.

Figure 6:
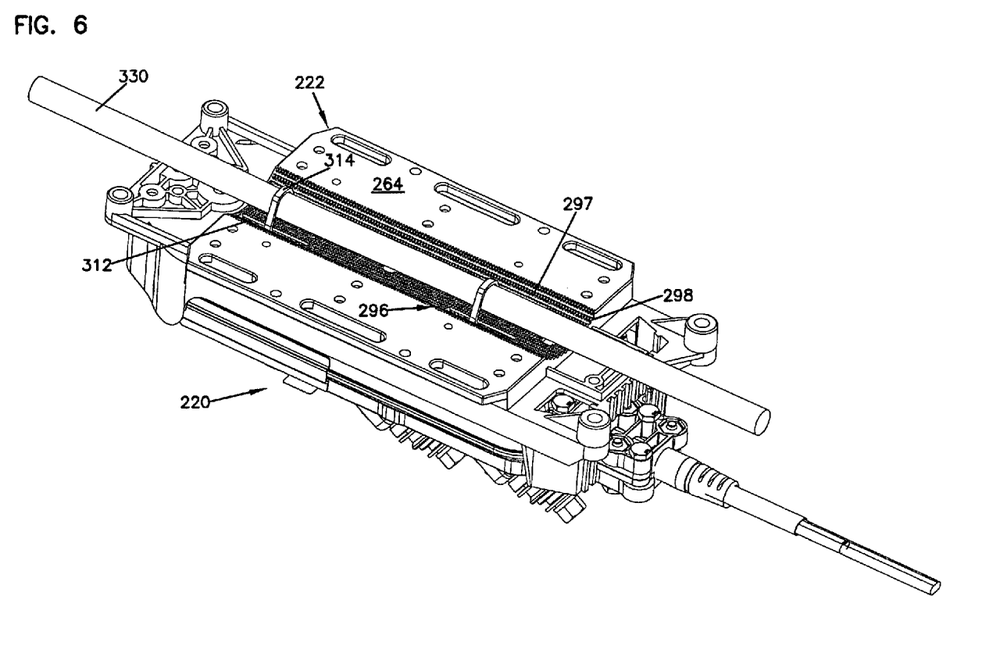
FIG. 6 shows the universal bracket of the system of FIGS. 2 and 3 secured to a strand such as a fiber optic cable or a copper cable.

Referring to FIG. 6, the use of the channel 296 and the strap receivers 308 to securely fasten the universal bracket 222 to a strand 330 will now be described. A portion of the strand 330 fits within the channel 296 of the universal bracket 222. The straps 314 are routed around the strand 330 and are also routed through the slots 312 of the strap receivers 308. When the straps 314 are routed through the slots 312, the strap-receiving members 310 are captured between the straps 314 and the strand 330. As the straps 314 are tightened, the gripping surface 297 of the channel 296 engages the strand 330. In the subject embodiment, the gripping protrusions 298 of the gripping surface 297 engage the strand 330 and are pressed into the strand 330 as the straps 314 are tightened. This engagement of the gripping protrusions 298 into the strand 330 provides superior retention of the desired position of the universal bracket 222 on the strand 330. Therefore, as described, the cooperation between the channel 296 and the straps 314 allows the universal bracket 222 to be securely attached to the strand 330.

Referring still to FIGS. 4 and 5, the base portion 260 further defines a plurality of through-holes 300 for mounting the universal bracket 222 to structures such as poles and hand holes. The through-holes 300 extend through the base portion 260 from the front side 262 to the back side 264. Countersunk shoulders or recesses 302 are provided at the front side 262 around the through-holes 300 to provide clearance for receiving structures such as bolt or screw heads. The through-holes 300 are generally positioned around the periphery of the base portion 260. The through-holes 300 are adapted to receive fasteners (e.g., screws or bolts) that are used to secure the universal bracket 222 to a structure such as the lip of a hand hole.

Referring now primarily to FIG. 4, the universal bracket 222 further includes enlarged through-holes 340 that are positioned generally along a center line of the universal bracket 222. The enlarged through-holes 340 have enlarged diameters as compared to the through-holes 300 and are adapted to receiving larger fasteners such a lag bolts. The enlarged through-holes 340 also include countersunk recesses 342 for receiving the heads of fasteners inserted through the through-holes 340. Fasteners inserted through the through-holes 340 can be used to secure the universal bracket 222 to a structure such as a pole.

For certain applications, an installer may want to use a securement technique that uses both a universal bracket 222 and the securement features provided on the drop terminal 226. To accommodate this possibility, the universal bracket 222 includes a through-hole that aligns with the through-hole 250 of the drop terminal 226. The alignment of the through-holes between the drop terminal and the universal bracket 222 allows an installer to insert fasteners through both the drop terminal 226 and the universal bracket 222 and into a structure to which it is desired to mount the drop terminal. In this type of configuration, the fasteners provide secondary retention of the drop terminal within the universal bracket 222.

While it is preferred to use the snap-fit configuration to secure the drop terminal within the cradle, it will be appreciated that other securement arrangements can also be used. For example, fasteners such as screws, straps, ties or other structures could also be used to secure the drop terminal within the cradle of the universal bracket.

From the forgoing detailed description, it will be evident that modifications and variations can be made in the devices of the disclosure without departing from the spirit or scope of the invention.

What is claimed is:

1. A drop terminal mounting system comprising:
   a drop terminal including a drop terminal housing to which a plurality of fiber optic adapters are mounted, the fiber optic adapters having exterior ports that are accessible from an exterior of the drop terminal housing;
   a bracket including a base portion, having a front side and a back side, a cradle disposed on the front side of the base portion for receiving the drop terminal, and a channel disposed on the back side of the base portion, wherein the channel is a groove that is adapted to receive a portion of a mounting structure for securing the drop terminal to the mounting structure.

2. The drop terminal mounting system of claim 1, wherein the channel is aligned with a centerline of the bracket.

3. The drop terminal mounting system of claim 1, wherein the channel has an arcuate shape.

4. The drop terminal mounting system of claim 1, wherein the channel defines a gripping surface.

5. The drop terminal mounting system of claim 4, wherein the gripping surface includes a plurality of gripping protrusions.

6. The drop terminal mounting system of claim 1, wherein the drop terminal is retained in the cradle by a snap-fit connection.

7. The drop terminal mounting system of claim 6, wherein the snap-fit connection is provided by a single resilient latch.

8. The drop terminal mounting system of claim 7, wherein the bracket is elongated along a length that extends between a first end and a second end of the bracket, wherein the drop terminal housing is elongated along a length that extends between a first end and a second end of the drop terminal housing, wherein the bracket defines a pocket at the first end of the bracket and the single resilient latch is located at the second end of the bracket, and wherein when the drop terminal housing is positioned within the cradle of the bracket, the first end of the drop terminal housing is retained within the pocket of the bracket and the second end of the drop terminal housing is retained by the single resilient latch.

9. The drop terminal mounting system of claim 1, wherein the bracket has a one-piece plastic construction.

10. The drop terminal mounting system of claim 1, wherein the bracket includes through-holes for receiving fasteners.

11. The drop terminal mounting system of claim 1, wherein the bracket is elongated along a length that extends from a first end to a second end of the bracket, wherein the cradle is defined by a wall structure including a first end wall that extends outwardly from the front side of the base portion and is located at the first end of the bracket, a second end wall that projects outwardly from the front side of the base portion and is located at the second end of the bracket, and side walls that project outwardly from the front side of the base portion and extend between the first and second ends of the bracket.

12. The drop terminal of claim 11, wherein the bracket includes a retention pocket located at the first end of the bracket and a resilient latch located at the second end of the bracket.

13. The drop terminal mounting system of claim 11, wherein the base portion defines through-openings that extend between the front and back sides of the base portion for receiving fasteners.

14. The drop terminal mounting system of claim 13, wherein at least some of the through-openings are arranged about a periphery of the base portion.

15. The drop terminal mounting system of claim 1, wherein the bracket defines through-openings that align with corresponding through-openings of the drop terminal housing.

16. The drop terminal mounting system of claim 1, wherein the bracket further includes at least one strap receiver for receiving a strap at the back side of the base portion.

17. The drop terminal mounting system of claim 16, wherein the strap receiver includes a strap-receiving member defining a slot for receiving a strap.

18. The drop terminal mounting system of claim 16, wherein the bracket includes at least two strap receivers aligned along a centerline of the bracket for receiving straps at the back side of the base portion.

19. A drop terminal mounting system comprising:
   a drop terminal including a drop terminal housing to which a plurality of fiber optic adapters are mounted, the fiber optic adapters having exterior ports that are accessible from an exterior of the drop terminal housing;
   a bracket including a base portion, having a front side and a back side, a cradle disposed on the front side of the base portion for receiving the drop terminal, and a channel disposed on the back side of the base portion;
   wherein the bracket is elongated along a length that extends from a first end to a second end of the bracket, wherein the cradle is defined by a wall structure including a first end wall that extends outwardly from the front side of the base portion and is located at the first end of the bracket, a second end wall that projects outwardly from the front side of the base portion and is located at the second end of the bracket, and side walls that project outwardly from the front side of the base portion and extend between the first and second ends of the bracket, the base portion defining through-openings that extend between the front and back sides of the base portion for receiving fasteners, at least some of the through-openings being arranged about a periphery of the base portion, wherein at least some of the through-openings are aligned along a centerline of the bracket and extend through the channel.

20. A drop terminal mounting system comprising:
   a drop terminal including a drop terminal housing to which a plurality of fiber optic adapters are mounted, the fiber optic adapters having exterior ports that are accessible from an exterior of the drop terminal housing;
   a bracket including a base portion, having a front side and a back side, a cradle disposed on the front side of the base portion for receiving the drop terminal, and a channel disposed on the back side of the base portion;
   wherein the bracket further includes at least one strap receiver for receiving a strap at the back side of the base portion, the strap receiver including a strap-receiving member defining a slot for receiving a strap, wherein the slot for receiving the strap extends through the channel.

21. A universal bracket for mounting a drop terminal comprising:
   a base portion having a front side and a back side;
   a cradle, adapted for receiving a drop terminal, located on the front side of the base portion; and
   a channel defined by the back side of the base portion;
   at least one strap receiver, the strap receiver including a strap-receiving member defining a slot that extends through the front side and back side for receiving a strap, wherein the slot extends through the channel.

22. A method for mounting a drop terminal to a mounting structure, the method comprising:
   securing a bracket to a mounting structure, the bracket including a base portion, having a front side and a back side, a cradle disposed on the front side of the base portion for receiving a drop terminal, and a channel disposed on the back side of the base portion, wherein a portion of the mounting structure is disposed in the channel; and
   mounting the drop terminal into the cradle of the bracket, wherein the drop terminal includes a drop terminal housing to which a plurality of fiber optic adapters are mounted, the fiber optic adapters having exterior ports that are accessible from an exterior of the drop terminal housing.

23. A method for mounting a drop terminal to a mounting structure as claimed in claim 22, wherein the mounting structure is selected from a group consisting of a strand and a pole.

* * * * *